INVENTOR.
EUGENE J. RYMASZEWSKI

BY Arthur S. Tenser

ATTORNEY

Sept. 18, 1962 E. J. RYMASZEWSKI 3,054,948

HIGH FREQUENCY MEASUREMENTS

Filed May 26, 1959 3 Sheets-Sheet 3

3,054,948
HIGH FREQUENCY MEASUREMENTS

Eugene J. Rymaszewski, Poughkeepsie, N.Y., assignor to International Business Machines Corporation, New York, N.Y., a corporation of New York Filed May 26, 1959, Ser. No. 815,967
18 Claims. (Cl. 324—58)

This invention relates to measurement of circuit parameters, and more particularly to measurement of transfer, or input-output, characteristics and related parameters, at high frequencies.

A transfer characteristic or parameter of a circuit or a circuit device is broadly defined as the ratio of output current or voltage to input current or voltage. When the desired ratio is of one current to another or one voltage to another, a dimensionless number results. These ratios are the current or voltage gains of the circuit device. If the ratio to be measured is that of a voltage to a current, an impedance dimension results. Thus, the ratio of input voltage to output current is the transfer impedance of the circuit. The inverse of this ratio gives us the transfer admittance. As will be understood from any standard text treating of circuit design and analysis, these parameters require as a condition of their measurement that the circuit output be either short or open circuited. For example, the current gain measurement requires that the output voltage be zero, or in other words, that the output be short circuited. Other measurements, such as of transfer impedance, require that the output current be zero, i.e. that the output be open circuited.

These parameters give the circuit designer information which will enable him to predict the behavior of the circuit or device in its intended environment. This data becomes increasingly important at microwave frequencies where these parameters become complex numbers and both their resistive and reactive portions markedly affect circuit design. Heretofore, measurement of such circuit parameters in the megacycle to kilomegacycle range has required elaborate coaxial cable or wave guide equipment and results were achieved only after a multiplicity of manual adjustments and interpretations of data. In many cases, the complexity of the equipment and the technique of measurement were such that accurate, reliable results were unattainable. The present invention provides both techniques and apparatus which will enable reliable parameter measurement with a degree of accuracy and simplicity not previously attained.

Accordingly, it is the principal object of this invention to provide a novel technique and apparatus for the measurement of circuit transfer characteristics and related parameters at high frequencies.

It is a further object of this invention to provide such technique and apparatus wherein both magnitude and phase angle of the measured quantities are indicated.

Another object of this invention is to provide novel apparatus for the measurement of transfer and related characteristics making use of transmission line elements whereby stray fields and leakage reactances may be reduced to a minimum or eliminated entirely.

Still another object of this invention is to provide such structure particularly adapted to enable measurement of transistor parameters and wherein such measurements may be made quickly and accurately.

Briefly, this invention comprises means to measure directly the ratio of output to input currents or voltages, both magnitude and phase, of the circuit or circuit device under test. The technique followed is to apply an alternating current of a frequency in the range under consideration through equal impedance elements to both the input and output terminals of the test circuit. If, for example, the current gain characteristic is desired, the signal applied to the output terminal is adjusted in amplitude and phase until a null voltage reading is obtained across the output terminal. The voltages across the two impedances are then compared. The null reading satisfies the requirement of the current gain characteristic definition that the output be short circuited at signal frequencies, and the voltages compared are directly proportional to the input and output currents, thereby giving the current gain directly. When the parameter to be measured requires that the output be open circuited (e.g., transfer impedance or open circuit voltage transfer ratio), the signal applied to the output is adjusted until zero current flows in the impedance element connected to the output line. The ratio of the voltage across the output terminals to the current flowing through the impedance in the input line then gives the transfer impedance. By suitable modification of the circuit and utilizing the principles of this invention, any transfer parameter may be measured. To achieve the desired results at the frequencies under consideration, simple coaxial or wave guide transmission line elements and techniques are used, whereby stray fields and reactances are minimized and accuracy and ease of operation are enhanced.

The foregoing and other objects, features and advantages of the invention will be apparent from the following more particular description of preferred embodiments of the invention, as illustrated in the accompanying drawings.

Figure 1:
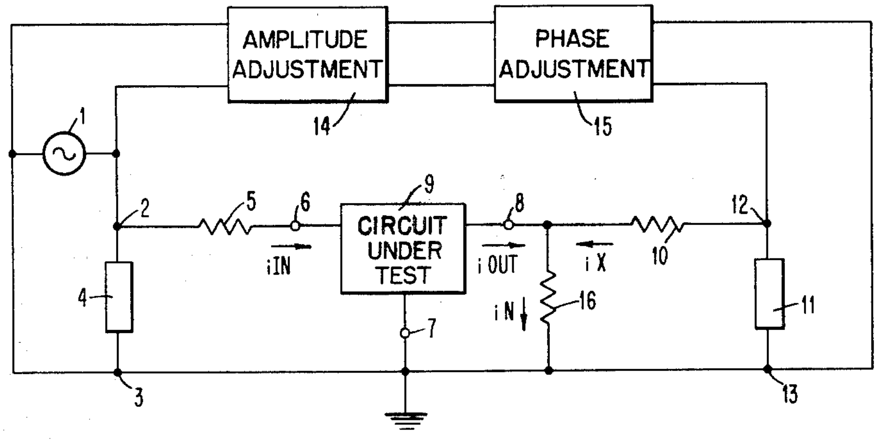
FIG. 1 is a circuit diagram illustrating the basic principle of the invention.

Referring now to FIG. 1 which illustrates the principle of the transfer characteristic measurement, source 1 is an alternating current generator providing energy at the frequency at which the circuit under test is to be used, and preferably is adjustable over a wide range in the microwave region. Energy from the source 1 is applied across the impedance 4 connected between terminals 2 and 3, the latter terminal being at reference or ground potential. Terminal 2 is connected through series resistance 5 to the input terminal 6 of the circuit 9 whose transfer characteristic is to be measured. The common terminal 7 of the circuit is connected to reference potential.

Energy from the source 1 is also supplied to terminals 12 and 13 through an amplitude adjusting element 14 and a phase adjusting element 15. The former may comprise an amplifier, an attenuator, or both, as will become apparent below. Alternatively, separate amplitude adjusting means may be provided between the source and terminals 2, 3. Both elements 14 and 15 may be any type of available circuits capable of operating at the frequency of source 1. Impedance 11 is connected between terminal 12 and reference potential terminal 13. Resistor 10 connects terminals 12 and 8, the latter being the output terminal of the circuit being measured. Resistance 16 represents the input impedance of a null detector coupled between the output and common terminals, 8, 7, of the test circuit.

The short circuit current gain or ratio of output to input current with the output short circuited, is measured as follows. As is apparent from the circuit of FIG. 1, the voltage present across impedance 4 supplies a current $i_{in}$ through resistor 5 to input terminal 6. Similarly, the voltage across impedance 11 provides a current $i_x$ through resistor 10 to output terminal 8. Resistors 5 and 10 are made equal to each other and non-reactive. The potential at terminals 12, 13, and thus the current $i_x$, is varied by operation of elements 14 and 15. The current $i_x$ is adjusted until it equals exactly, both in phase and amplitude, the current $i_{out}$ flowing out of the test circuit. This equality is indicated by zero current $i_n$ flowing in the null detector impedance 16. When this null condition is reached, the current flowing through resistance 10, $i_x$, is exactly equal to the output current $i_{out}$ of the test circuit. Since both resistances 5 and 10 were made exactly equal to each other and non-reactive, the voltages across them will have the same amplitude ratio and phase relationship as the currents flowing through them. Accordingly, measurement of the complex ratio of voltages across resistors 10 and 5 will give the current gain characteristic. It will be noted that since $i_n$ is adjusted to zero, the requirement of the transfer characteristic that output voltage be equal to zero is fulfilled. Other short circuit parameters may be obtained merely by taking voltage or current readings at appropriate points in the circuit.

To achieve the open circuit condition, such as for the transfer impedance measurement, it is necessary only to remove the null detector, represented by impedance 16, from across the terminals 8, 7 and connect it across terminals 8, 12. The elements 14 and 15 are then adjusted until the detector reads zero, which will indicate no current flow through the resistance 10. This is the open circuit condition and the ratio of the voltage across impedance 11 to the current flowing through resistance 5 gives the transfer impedance. As is apparent, any open circuit parameter may similarly be measured.

Figure 2:
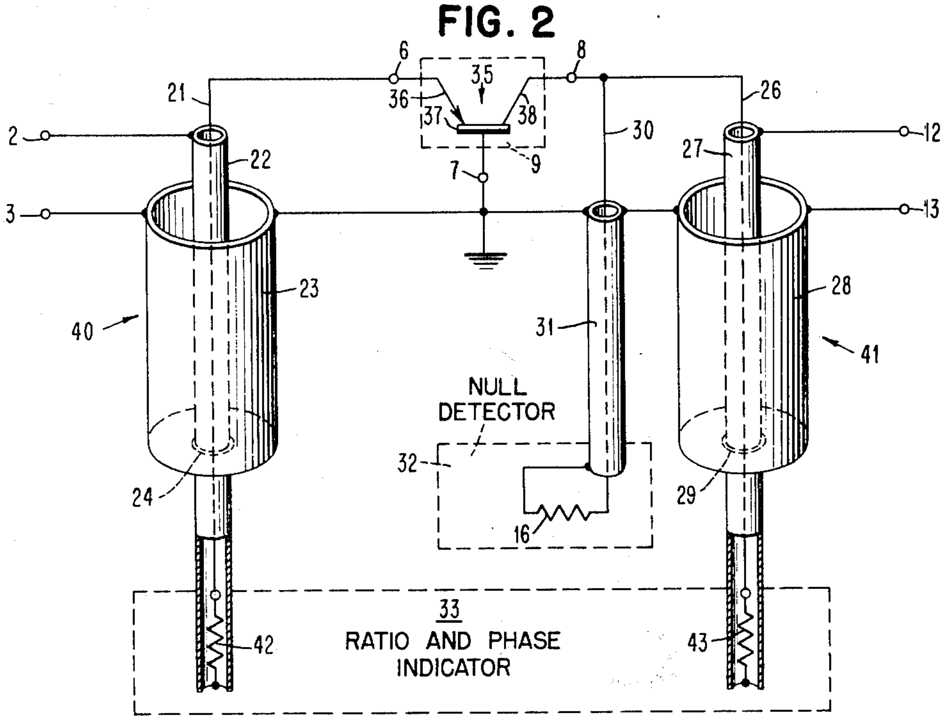
FIG. 2 shows an embodiment of the invention utilizing coaxial transmission line elements.

At frequencies in the range of hundreds and thousands of megacycles, lumped constant circuitry is unreliable and transmission line techniques must be used to obtain accurate measurements. FIG. 2 illustrates a practical embodiment of a portion of the circuit of FIG. 1 utilizing coaxial transmission line elements. Since source 1 and elements 14 and 15 of FIG. 1 are standard components, they are not shown in FIG. 2, this figure being limited to the circuitry between terminals 2, 3 and 12, 13 of FIG. 1. Like numerals are used to designate similar elements wherever applicable.

In FIG. 2, as an example of one particular use of the invention, a transistor 35 is shown as the test circuit 9. The transistor 35 has emitter 36, base 37, and collector 38, and as illustrated, is connected in the test circuit in the grounded base configuration. The transfer characteristic to be measured will then be the emitter to collector current gain of the transistor, commonly called "alpha" ($\alpha$). It is well known that beyond a low frequency range, the "alpha" of a transistor varies considerably with frequency. Moreover, with increasing frequency, a phase shift is introduced through the transistor, making "alpha" a complex quantity. Accordingly, it will be seen that this invention is well suited to measurement of transistor current gain. It will be apparent that all types of transistors may be accommodated by this apparatus, the amplitude adjustment providing for gains either less than or greater than unity. Also, it will be obvious that the base to collector current gain (beta) may be measured merely by reversing the base and emitter connections shown.

The apparatus of FIG. 2 is comprised principally of a pair of coaxial transmission line devices 40, 41, commonly known as "bazookas." Center conductor 21 of bazooka 40 is connected to input terminal 6 and first concentric sleeve 22 is connected to terminal 2. Elements 21 and 22 form a first coaxial transmission line and is terminated at its other end by a resistor 42 equal in value to the characteristic impedance of the line. Thus this resistance is effectively in series between terminals 2 and 6. No reactive impedance is introduced between these terminals because the coaxial line is properly terminated.

A second coaxial line is formed by concentric conductors 22 and 23, the latter surrounding its inner conductor along a portion of its length and being short circuited to it at its lower end 24. The upper or open end of the sleeve 23 is connected to terminal 3 at reference potential.

The bazooka element is used to obviate the necessity of connecting current measuring (i.e. ammeter) apparatus directly in series between terminals 2 and 6. This apparatus enables a voltage reading, directly proportional to the current flow, to be taken without introducing meter losses and other inaccuracies in the line. The bazooka then may be termed an A.C. voltmeter to ammeter converter. Looking from terminal 2 towards terminal 6, the coaxial line 21, 22 presents a series resistance equal to the characteristic impedance of the line. This is the resistance 5 of FIG. 1. The voltage appearing across resistor 42 terminating the line can then be measured to give a measure of the current flow. Commercially available equipment for measuring high frequency parameters however, normally requires that the outer conductor of the coaxial cable input be grounded to provide a reference voltage. Neglecting outer sleeve 23 for a moment, it can be seen that grounding of conductor 22 at its lower end would short terminal 2 to ground and render the equipment useless. To make this approach workable with standard meter equipment, means must be provided to isolate conductor 22 from ground insofar as terminal 2 is concerned. The outer sleeve 23 provides the necessary isolation. As shown, the bottom of the sleeve 23 is connected to the conductor 22 at 24, conductor 22 now being considered the inner conductor of a coaxial transmission line consisting of concentric cylinders 22 and 23. The top of outer sleeve 23 is grounded at terminal 3. The impedance between the upper end of conductor 22 (or terminal 2) and ground (or terminal 3) is then the input impedance of the transmission line 22, 23. All that is required for isolation is that an impedance other than zero be present, since any finite voltage between 2 and 3 will cause current flow. In the case of a lossless line, this impedance is different from zero as long as the length of the line (i.e. the length of sleeve 23) differs from one half of the wave length of the operating frequency or an integral multiple thereof. If a lossy transmission line is used, then this impedance will always be different from zero. The impedance presented by the line 22, 23 to terminals 2, 3 is the impedance element 4 of FIG. 1. As can be appreciated from consideration of FIG. 1, the value of current flowing through impedance 4 (and impedance 11) does not affect the measurement.

An identical transmission line element 41, comprised of concentric conductors 26, 27 and 28, is provided at terminals 12 and 13. Center conductor 26 is connected to output terminal 8 and conductor 27 has its upper end connected to terminal 12. Ground terminal 13 is connected to the upper or open end of outer sleeve 28 which has its lower end shorted to conductor 27 at 29. Coaxial line 26, 27 is terminated at its lower end by a resistance 43 equal to its characteristic impedance. The coaxial lines 21, 22 and 26, 27 are made to have the same characteristic impedances. Operation of the bazooka 41 is the same as that described in connection with element 40. Line 26, 27 presents a series resistance equal to its characteristic impedance between terminals 8 and 12, and line 27, 28 provides an isolating impedance (impedance 11 of FIG. 1) between terminals 12, 13.

A null detector 32 of any suitable type is connected via a coaxial cable 30, 31 between terminal 8 and ground, the outer conductor being grounded. The resistance 16 coupled across the lower end of the line represents the impedance of the detector. Since at the time of measurement, the current into the detector is zero, this element does not affect the accuracy of operation of the circuit.

The lower or terminated ends of coaxial lines 21, 22 and 26, 27 may be arranged to be connected to any commercially available equipment capable of measuring the amplitude ratio and phase difference between the voltages appearing across resistances 42 and 43. One such equipment which has been successfully used with the above described apparatus is the Rohde and Schwarz diagraph, an instrument which indicates directly on a polar coordinate chart the complex ratio between two voltages of the same frequency. The characteristic impedance of cables 21, 22 and 26, 27 would then be selected to match the impedances of the two inputs to the diagraph which are equal. Since the ratio is indicated directly, no interpretation or computations are necessary to note results. Models are available which operate from 30 to 2400 megacycles. Although this instrument has been found to be desirable, it will be apparent that other types of measuring and indicating equipment may be used.

The apparatus of FIG. 2 functions in a manner identical to that of the circuit of FIG. 1. Elements 14 and 15 are adjusted until a zero or null reading is reached at detector 32. The transfer characteristic of the tested element, e.g., the "alpha" of the transistor 35, may be read directly from the indicator 33. As in FIG. 1, the open circuit condition may be simply achieved; the null detector 32 is connected across terminating resistor 43 and a connection to the measuring apparatus made to terminals 12, 13.

As noted above, operation of the circuit depends on the presence of finite impedances between the outer sleeves 23, 28 and conductors 22, 27, respectfully. By making these lines lossy, it is assured that there will be no frequency at which they will present zero impedance and render the apparatus inoperative. If the space between these concentric conductors is filled with a lossy material, relatively high impedances will result at all frequencies, thereby increasing the usable bandwidth of the apparatus. At lower frequencies, where it may become necessary to lengthen the coaxial cables 21, 22 and 26, 27 to effect proper impedance relationships, these lines may be spiralled around a core of the lossy material, to conserve space.

The circuits of FIGS. 1 and 2 have been described in terms of their A.C. characteristics only. It will be obvious however, that when measuring transistor parameters for example, suitable D.C. potentials must be supplied to establish proper operating conditions. These connections may be made to the circuits described in any convenient manner through suitable isolating chokes and blocking capacitors, to prevent interaction between A.C. and D.C. energy which might render the readings inaccurate. It is believed that such connections would be obvious to one skilled in the art and are thus eliminated from the drawings and description to simplify the explanation. The use of chokes rather than resistors is preferable, since voltage drops are thereby eliminated and D.C. values may be read directly at the supply.

Figure 3:
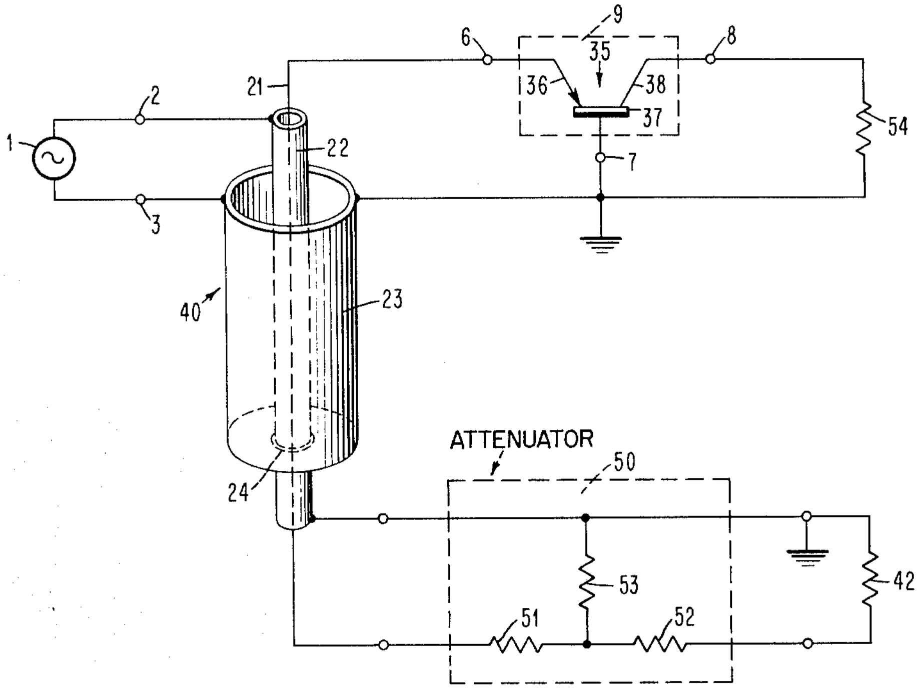
FIG. 3 is a diagrammatic representation of a modification of the basic circuit used to obtain cut-off frequency characteristics.

In FIG. 3 is shown a modification of the circuit of FIG. 2 which may be used to measure cut-off frequency or to make constant cut-off frequency contours. The circuit comprises basically the input half of the circuit of FIG. 2 and similar elements are designated by the same reference numerals.

The source 1 supplies high frequency energy to input terminals 2, 3 across which is connected the outer coaxial line 22, 23 of bazooka 40. The inner coaxial line 21, 22 is connected between terminals 2 and 6 in the same manner as described in connection with FIG. 2. It will be seen that bazooka 40 of FIG. 3 is similar in connection and function to the like element of FIG. 2 and reference may be had thereto for a more detailed description. The output terminal 8, to which the output lead of the circuit under test is connected, is tied through resistor 54 to ground. This resistor is made equal to the characteristic impedance of the coaxial cable 21, 22 and conveniently may consist of a suitably terminated length of coaxial cable.

The lower end of transmission line 21, 22 is coupled through a 3 db attenuator 50 to a resistance 42 equal to its characteristic impedance. Resistances 54 and 42 are thus equal in value. The attenuator is shown as a T pad comprised of resistors 51, 52 and 53, although any reflectionless circuit providing 3 db attenuation may be used. The voltages appearing across resistances 42 and 54 are brought to any suitable detector which will indicate when they are equal. The diagraph discussed above may be used, or a single volt-meter connected through a coaxial switch to the two resistances may be employed.

The cut-off frequency of a device, such as a transistor, is conventionally defined as the frequency at which the output of the device falls 3 db below the input. At this point, the output current would be .707 of the input current. To measure cut-off frequency with the device of FIG. 3, the transistor or other element to be tested is connected to the terminals 6, 7 and 8, and the frequency of source 1 increased until the voltages at 42 and 54 are equal. This will indicate that the output is 3 db below the input and the frequency may then be read directly from calibrations on the source, or a frequency meter coupled thereto. It will be realized that other amounts of attenuation may be used if the measurement to be taken so requires.

As discussed in connection wtih FIG. 2, in cases, such as measurement of transistor parameters, D.C. operating potentials will be required. In the apparatus of FIG. 3, as in FIG. 2, these may be supplied through suitable isolating chokes and blocking capacitors. It will be realized that the circuit of FIG. 3 will give the cut-off frequency for any given D.C. operating point. Lines of constant cut-off frequency versus operating point of a transistor can be easily plotted by keeping the frequency of the input constant and varying emitter current and reverse collector voltage until the voltages across 42 and 54 are equal.

In the arrangements of FIGS. 2 and 3, the terminals 6, 7 and 8 of the measurement circuit may conveniently be tied to socket means, whereby the circuits or devices to be measured may be quickly inserted or removed. Such a socket, adapted, for example, to receive the pins of transistors, together with the inherent speed and simplicity of the apparatus as a whole, would make precision measurement on a production line basis feasible.

Figure 6:
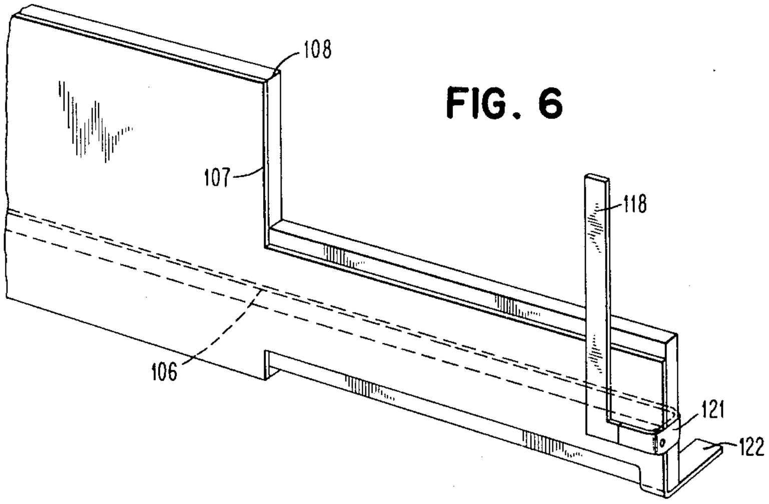
FIG. 6 is a detail of a portion of the structure of FIG. 4.
Figures 4, 5:
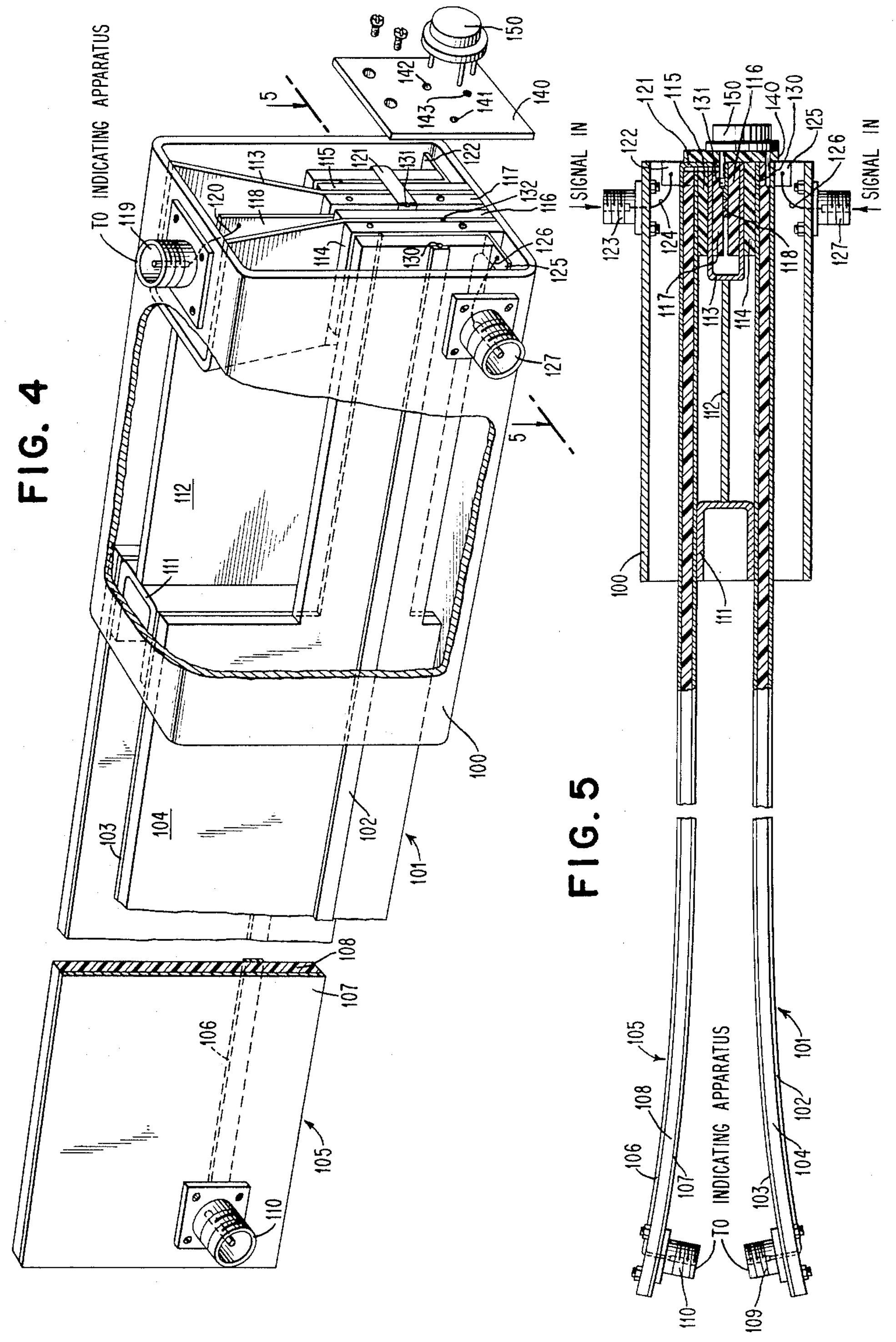
FIG. 4 illustrates another embodiment of the invention utilizing flat strip wave guide elements.
FIG. 5 is a partial section of the structure of FIG. 4 taken at line 5—5.

As frequencies increase, the stray inductive fields and leakage capacitance resulting from circuit connections alone, begin to seriously impair the accuracy of measurement. Accordingly, to insure reliable results at extremely high frequencies, apparatus must be used which will reduce these undesirable effects to the minimum. One such apparatus is shown in FIGS. 4, 5 and 6. As will be pointed out hereinafter, this arrangement is an exact functional equivalent of the circuits of FIGS. 1 and 2, but because of its unique arrangement and use of so-called "strip" transmission lines, stray fields and capacitances are virtually eliminated. The particular apparatus shown was adapted for transistor "alpha" measurement use and will be described as such. However, it will be obvious that simple adaptations of the apparatus can be made to accommodate other types of circuit devices and connections may be varied to give either open or short circuit parameters.

Referring now more particularly to FIG. 4, the apparatus of the invention is shown in perspective and in partial section to more clearly show the novel arrangement. Certain thicknesses and dimensions have been exaggerated, however the size of the overall structure is approximately to scale with respect to the transistor shown. Casing 100 is made of conductive material such as sheet metal and is rectangular in cross section and open at both ends, acting as shielding means and ground plane for the apparatus. Members 101 and 105 are lengths of so-called "strip" transmission lines, the former comprising a ribbon of conductive material 102, a wider conductive plate 103, and a separator 104 of a dielectric material. Line 105 comprises ribbon conductor 106 and conductive plate 107 separated by a dielectric 108. As is well known, in a transmission line of this character, the narrow conductor acts as the "line" conductor and the wider conductive plate is the ground plane. A more detailed discussion of this type of transmission line may be found in U.S. Patent No. 2,721,312, issued October 18, 1955.

As is shown in the drawing, transmission line 101 is broken off to show the inner or ground conductor side of line 105, which is also broken for purposes of the drawing. The relationship of the two transmission lines is more clearly shown in the plan view of FIG. 5. Lines 101 and 105 are arranged with their respective ground conductors 103, 107, facing each other. Coaxial cable connectors 109 and 110 are connected on the ground conductor sides of the transmission line 101 and 105 respectively. The center pins of the connectors are connected through to the ribbon conductors 102, 106 while the outer sleeves are conductively fastened, such as by bolts, to be in electrical contact with the ground planes 103, 107.

The transmission lines 101, 105 are narrowed in width over a portion of their length at the end within the casing 100. This is done to increase the impedances between ground plane conductors 103 and 107, respectively, to ground. The lines are kept separated within the casing by means of a divider structure composed of a channel member 111, a flat plate 112, and a second channel member 113, all of conductive material. These members may be soldered or otherwise conductively joined to form a unitary structure which traverses the entire height of the casing, and is in electrical contact with the interior top and bottom surfaces thereof. The casing 100 is thus divided into a pair of chambers.

Channel 111 has its flanges in conductive contact over their entire length with the ground plane conductors 103 and 107 respectively. As can be seen from FIG. 4, the transmission lines 101, 105 are narrowed just inwardly of this contact area. Channel 113 is somewhat narrower than channel 111 at its lower portion but is separated from ground planes 103, 107 by blocks of dielectric material 114, 115 respectively. Above the upper edge of the lines 101, 105, the channel 113 flares outwardly towards the upper interior surface of casing 100. Within the lower narrower portion of channel 113 are a pair of dielectric blocks 116, 117, between which is supported a conductive strip 118. At the top of the casing 100 is fastened a coaxial connector 119, having its inner member connected via a wire 120 to the conductive strip 118. The lower end of strip 118 is connected by means of a further conductive strip 121 to the ribbon conductor 106 on the transmission line 105. The dielectric separators 115, 117 and the flange of channel member 113 may be notched to receive the conductor 121, so that the entire front surface of the structure may be kept flat.

At the lower corner of the conductor 105, a lug 122 is formed projecting from the ground plane conductor 107. This lug is connected by wire lead 124 to the center post of coaxial connector 123, mounted exteriorly on the side of casing 100. A similar lug 125 is formed on ground plane conductor 103 and is connected by lead 126 to the center post of coaxial connector 127 also mounted on casing 100. FIG. 6 is a detail showing the construction of elements 118, 121 and the connection to line 105.

As noted above, this particular structure was adapted for transistor measurements and provision is made to receive the emitter, base and collector pins of the transistors. The apparatus as shown will accept the transistor for measurement of emitter-to-collector current gain, but obvious modifications will permit base-to-collector current gain measurements. As shown, holes to receive the transistor pins are drilled at 130, 131 and 132.

As can be seen in FIG. 5, hole 130 is drilled at least partially within ground plane conductor 102 and hole 131 is drilled at least partially within conductor 118. These holes receive the emitter, and collector pins respectively, of the transistor which are thereby held in electrical contact with conductors 102 and 118. Hole 132 is drilled at least partially in the flange of channel 113 located between elements 118 and 103 and receives the base pin of the transistor in electrical contact with 113. A dielectric cover plate 140 is provided with corresponding holes 141, 142 and 143 and is fastened over the end portion of the apparatus by means of screws. The transistor 150 may then be quickly inserted and removed from the measuring apparatus.

Operation of the device of FIGS. 4, 5 and 6 can best be described by comparing it to the apparatus of FIGS. 1 and 2, to which it is functionally identical. Coaxial connectors 127 and 123 correspond respectively to terminals 2, 3 and 12, 13 to which the high frequency signal from source 1 is applied. It will be realized of course, that all the coaxial connectors shown in FIGS. 4 and 5 have their outer, threaded portion conductively connected to the surface to which they are fastened and their inner conductors or center posts insulated therefrom and connected as described. Coaxial connector 119 provides coupling to the null detector 32, and connectors 109 and 110 provide the outputs to the ratio and phase indicator 33.

Strip transmission line 101 forms a first two conductor line with conductors 102, 103 equivalent to the conductors 21, 22 respectively. The divider structure 111, 112 and 113 provides a second two conductor transmission line with ground plane conductor 103 and is equivalent to the outer sleeve 23 of FIG. 2; channel 111 being shorted to ground plane 103 and the channel 113 being insulated therefrom by dielectric block 114. Casing 100 is conductively connected to the divider and provides shielding for the entire structure thereby reducing stray fields. The input signal is applied via coaxial connector 127 between the casing 100 and the lug 125 on ground plane conductor 103. It can be seen that this structure is fully equivalent to the bazooka element 40 of FIG. 2 and performs a similar voltmeter-to-ammeter conversion. The transmission line 105 and the divider structure forms a second transmission line means equivalent to the means 41 of FIG. 2 and member 118, connected to conductor 106 provides the connection to the null detector terminal 119.

It can readily be appreciated from consideration of FIGS. 4 and 5, that the apparatus shown therein provides a compact, shielded structure with which connector leads of the circuit device to be tested are kept to minimum length. In the case of the transistor shown, the pins are almost completely received in elements of the structure itself, thereby reducing lead inductances and capacitances virtually to zero. To accommodate other circuit devices, thicknesses of dielectric blocks may be varied or adapter sockets may be fabricated.

In making transistor measurements, once D.C. is applied to the device, it is necessary only to couple the signal source, null detector and ratio and phase indicator to the proper terminals, adjust the amplitude and phase of the signal supplied to one of the terminals until a zero reading is obtained at the null detector, and then read the results on the indicator. This ease and rapidity of operation is of great advantage in the laboratory and could be useful for production line testing at the conclusion of the transistor manufacturing process.

As mentioned previously in connection with FIG. 2, certain circuit devices to be measured, such as transistors, required D.C. potentials to establish operating levels. These connections have not been shown since one skilled in the art may readily provide such potentials through suitable isolating chokes and blocking capacitors. In the actual apparatus built in accordance with FIGS. 4 and 5, connections were made at points on the transmission line elements 101, 105 and brought out to contacts mounted on the casing. The power supply was then plugged into the contacts.

For the sake of simplicity of the drawing, certain structural elements have been omitted from FIGS. 4 and 5, but these in no way change the electrical characteristics of the device. For example, to insure mechanical rigidity, fasteners between the transmission line elements, the divider structure and the casing are provided. Additional dielectric spacers are also used to keep the various elements properly spaced.

The apparatus of FIGS. 4 and 5 may also be used to perform the function of the circuit of FIG. 3. This can be accomplished by connecting the variable frequency source to coaxial connector 127, the resistance 54 to connector 119, and the attenuator 50 to connector 109, connectors 110 and 123 being left unused. In this use, the coaxial line providing the resistance 54 would have to be adjusted to compensate for impedance changes introduced by the structure. Adaptation of the structure of FIGS. 4, 5 and 6 to make open circuit measurements can be effected in the manner discussed in connection with FIG. 2.

From the foregoing description, it can be seen that the present invention provides a technique and apparatus for the making of high frequency parameter measurements that combines great accuracy with reliability and ease of use.

While the invention has been particularly shown and described with reference to preferred embodiments thereof, it will be understood by those skilled in the art that various changes in form and details may be made therein without departing from the spirit and scope of the invention.

What is claimed is:

1. A method of measuring complex high frequency transfer characteristics of a circuit device having input and output terminals, comprising the steps of applying a first alternating current of a predetermined frequency in the range under consideration to the input terminal of said device, applying a second current of said predetermined frequency to said output terminal, measuring the current flowing at said output terminal, adjusting the relative amplitudes and phases of said first and second currents until a null value of current between the output current and said second current is measured at said output terminal, and measuring the ratio of the amplitudes and the phase differences of currents or voltages present at said output terminal to currents or voltages present at said input terminal to provide the desired transfer characteristic measurement.

2. A method of measuring the cut-off frequency of a circuit device, said device having input and output terminals, consisting of the steps of, applying a first portion of an alternating current signal to the input terminal of said device, attenuating a second portion of said alternating current signal a predetermined amount, measuring the signal at said output terminal and said attenuated signal, and varying the frequency of said alternating current signal until the signal at said output terminal and said attenuated signal are equal.

3. High frequency measurement apparatus comprising, a source of high frequency alternating current, a first transmission line element terminated at one end by its characteristic impedance, a second transmission line element terminated at one end by its characteristic impedance, means coupling said first transmission line to said source and to the input terminal of the circuit device to be measured, means coupling said second transmission line to said source and to the output terminal of said circuit device, said coupling means effectively placing the characteristic impedances of said transmission lines between said source and the respective terminals, means to vary the amplitude and phase of the alternating current supplied to one of said terminals, a null detector coupled to said output terminal, and means to measure the voltages present at the terminated ends of said transmission lines.

4. The apparatus of claim 3 above, wherein said transmission lines are coaxial cables.

5. The apparatus of claim 3 above, wherein said transmission lines are strip lines comprising a narrow ribbon conductor separated from a wider conductive plate by a dielectric material.

6. Apparatus for measuring the high frequency cut-off characteristic of a circuit device having input and output terminals comprising, a source of variable frequency alternating current, a length of transmission line having the terminals at one end of said line connected between said source and the input terminal, a first impedance element equal in value to the characteristic impedance of said line, means providing a predetermined amount of signal attenuation coupling said first impedance element to the terminals at the other end of said line, a second impedance element equal in value to the characteristic impedance of said line connected to the output terminal of said device, means to vary the frequency of said source, and means to indicate when the voltages appearing across said first and second impedances are equal.

7. In apparatus for measuring high frequency characteristics of a circuit device having input, output and common terminals, the combination of a source of high frequency having two terminals, transmission line means coupling said source to said circuit device, said transmission line means comprising a first pair of transmission line conductors terminated at one end by the characteristic impedance of the line and having the other ends of the conductors connected respectively to one terminal of said source and the input terminal of said circuit device, a further conductor having one end connected to the other terminal of said source and to the common terminal of said device and having its other end coupled to one of said first pair of transmission line conductors, whereby said further conductor and said one of said first pair of conductors forms a transmission line presenting a finite impedance to said source, signal measuring means coupled to the terminated end of said first pair of transmission line conductors, and signal measuring means coupled to said output terminal of said device.

8. The apparatus of claim 7 above wherein said first pair of transmission line conductors comprises a section of coaxial cable and said further conductor comprises a conductive sheath concentrically surrounding said coaxial cable and conductively connected to a point on the outer conductor thereof.

9. The apparatus of claim 7 above further comprising an additional transmission line means, similar to the above mentioned means, coupling said source to the output and common terminals of said circuit device.

10. The apparatus of claim 9 above wherein amplitude and phase adjusting means are provided between said source and one of said transmission line means.

11. Apparatus for measuring the complex high frequency transfer characteristics of a circuit device having input, output and common terminals, comprising in combination first and second transmission line elements, each of said elements comprising a narrow conductive strip and a wider conductive strip separated by a dielectric material, conductive divider means for maintaining said first and second transmission line elements in spaced relationship, said divider means extending along a portion of the lengths of said first and second transmission line elements and having one end thereof in electrical contact with both said wider conductive strips and the other end thereof insulated from said wider conductive strips, whereby said divider means and the wider conductive strips of said first and second transmission line elements form third and fourth transmission line elements respectively, insulating means in physical contact with both said narrow conductive strips and said divider means for connecting said circuit device to said apparatus, so that when the device is connected to the apparatus the input and output terminals are coupled to the narrow strips of the first and second transmission lines respectively and the common terminal coupled to the divider means, means connected to the divider means and to the wider conductive strip of the first transmission line element to supply high frequency alternating current to said third transmission line element, and means connected to the divider means and to the narrow conductive strip of the second transmission line element for measuring the voltage between the divider means and the narrow conductive strip of the second transmission line element.

12. The apparatus of claim 11 above further comprising voltage indicating apparatus connected to said first transmission line element, the said one end of said divider means being located along the length of said first transmission line element between said indicating apparatus and said alternating current supply means.

13. The apparatus of claim 12 above, further comprising attenuator means included in the connection between said voltage indicating apparatus and said first transmission line element.

14. The apparatus of claim 12 above, further comprising means coupled to said divider means and to the wider conductive strip of said second transmission line element to supply high frequency alternating current to said fourth transmission line element, and voltage indicating apparatus connected to each of said transmission line elements, the said one end of said divider means being located along the length of said transmission line elements between said indicating apparatus and said high frequency alternating current supply means.

15. The apparatus of claim 14 above, wherein both said high frequency alternating current supply means operate at the same frequency and comprise further means to adjust their relative amplitudes and phase.

16. The apparatus of claim 15 above wherein said voltage measuring means comprises a null detector.

17. The apparatus of claim 11 above, further comprising shielding means surrounding at least said portion of said transmission lines and said divider and in electrical contact with said divider.

18. The apparatus of claim 7 above, further comprising means providing a predetermined amount of signal attenuation coupled between the terminated end of said first pair of transmission line conductors and said first mentioned signal measuring means.

References Cited in the file of this patent

UNITED STATES PATENTS

| | | |
|---|---|---|
| 2,654,066 | Rosenbaum | Sept. 29, 1953 |
| 2,719,262 | Bousman | Sept. 27, 1955 |
| 2,799,827 | Geppert et al. | July 16, 1957 |
| 2,856,585 | Gibbons | Oct. 14, 1958 |
| 2,896,156 | Perrins | July 21, 1959 |
| 2,958,824 | Thomas | Nov. 1, 1960 |

OTHER REFERENCES

Cornell-Dubilier publication, "A Simple Transistor Tester," volume 19, No. 5, May 1954; pages 3–9.